Apr. 3, 1923

R. COURTOIS-SUFFIT

LANDING INDICATOR FOR AIRCRAFT

Filed Dec. 20, 1918

INVENTOR
Roger Courtois-Suffit
BY
ATTORNEY

Apr. 3, 1923. 1,450,431
R. COURTOIS-SUFFIT
LANDING INDICATOR FOR AIRCRAFT
Filed Dec. 20, 1918 2 sheets-sheet 2

INVENTOR
Roger Courtois-Suffit
BY
ATTORNEY

Patented Apr. 3, 1923.

1,450,431

UNITED STATES PATENT OFFICE.

ROGER COURTOIS-SUFFIT, OF PARIS, FRANCE.

LANDING INDICATOR FOR AIRCRAFT.

Application filed December 20, 1918. Serial No. 267,634.

*To all whom it may concern:*

Be it known that I, ROGER COURTOIS-SUFFIT, citizen of the Republic of France, and resident of Paris, France, (post-office address 2 Passage du Chemin Vert), have invented a new and useful Landing Indicator for Aircraft, which improvements are fully set forth in the following specification.

This invention relates to landing indicators for use on air craft, enabling the pilot to gauge the vertical distance of the machine from the ground and indicating to him, with the greatest possible precision, the instant at which his machine should land, without his having to look at the ground. Consequently, in the event of the pilot being in difficulties when preparing to land, owing to inability to see the ground, it will be possible for him to readily determine the proper moment at which to execute the necessary straightening-out manœuvers.

The improved indicator is chiefly intended for use on dark nights or in foggy weather, when it is sometimes very difficult to gauge the approach of the land.

The invention is based on the theory that a body moving in the air is exposed thereby to aerodynamic reactions. Numerous experiments have shown that these reactions will vary as the body approaches the ground.

It will be readily understood that under these conditions, if two vertically spaced points are taken on an aircraft, the air pressure at the point placed at the lower level will be less than that at the point placed at the upper level; in other words, the lower point will be more influenced than the upper by the proximity of the ground when the machine approaches the ground. This results in a difference of reactions at these two points, which it will be possible to record.

It will be assumed at that the two points above referred to are arranged, for example, two pressure funnels or bell mouths. If the actions of these elements are equalized and controlled in some suitable manner it will be apparent that in the vertical zone adjoining the landing, it will be possible at any moment to readily take a reading of the difference in pressures produced at that moment, and to utilize such reading to determine the distance of the machine from the ground.

The two points at which the funnels or bell-mouths are arranged may be so chosen as to take advantage of the influence that the ground may have on certain parts of an aeroplane flying at a very low height. Thus, if the supporting surface of the machine is influenced by the ground, it may be advisable to place the bottom funnel below the supporting surface or at any other similar suitable point, for the purpose of still further amplifying the difference of effect produced on the two separate funnels by the proximity of the ground.

It is pointed out that pressure funnels or bell mouths are referred to merely by way of example. They may be replaced by various other devices, i. e., bodies or devices of different shapes capable of transmitting the air reactions and connected together by a suitable transmission gear which may be pneumatic, mechanical, electrical, etc. So also the following description of the complete mechanism is illustrative merely of one embodiment of the invention, based upon the principles above set forth.

In the accompanying drawing, wherein such embodiment is represented:

Figure 1:
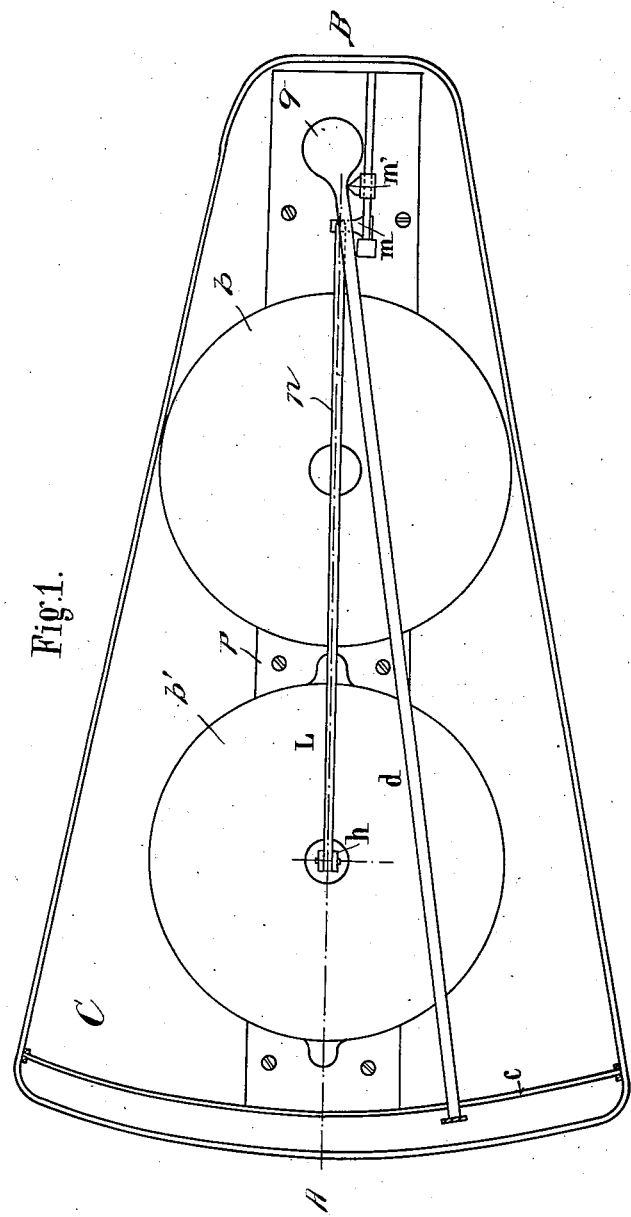
Figure 1 is a side elevation of the indicator.
Figure 2:
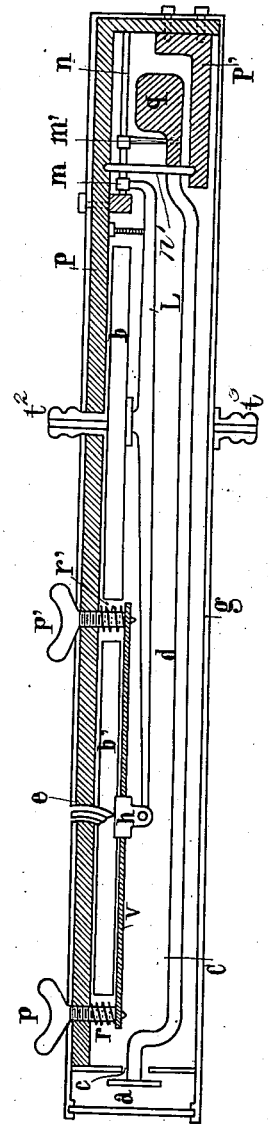
Figure 2 is a section on line A—B, Figure 1.
Figure 3:
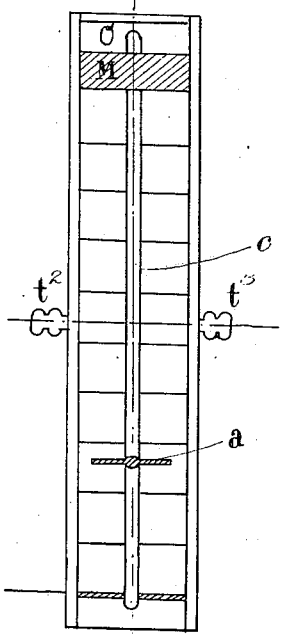
Figure 3 is a front elevation.
Figure 5:
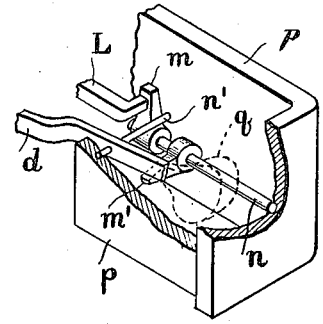
Figure 5 is a fragmental perspective view of one end of the indicator.
Figure 4:
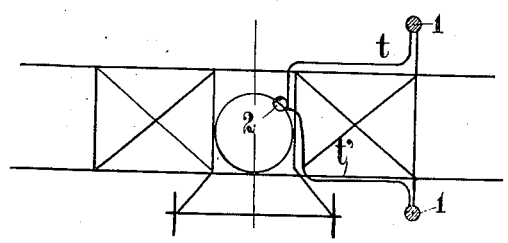
Figure 4 is a diagrammatic view showing the indicator installed on a machine.

Referring more particularly to the drawing, the two funnels are indicated at 1, 1, in Figure 4, and are shown as connected by tubing $t$, $t'$ to the receiver 2. The latter, which is represented in Figures 1 and 2, comprises an air-tight gear case C, substantially sector-shaped and provided with oppositely-located tubular nipples $t^2$ and $t^3$ to which the ends of the tubes $t$ and $t'$ are respectively attached. The nipple $t^3$ opens into the interior of the gear case C, but the nipple $t^2$ opens into an aneroid cup $b$, the flexible portion or diaphragm of which has connected to its center a lever L. This lever L is fulcrumed adjacent its rear end on a bearing $l$, and is provided at said end with a laterally offset portion which abuts against a lateral arm $m$ fastened to a small horizontal rock shaft $n$, which, in turn, is suitably journaled within the gear case. Shaft $n$ has fastened to it a second lateral arm $m'$, the free end of which bears against the lower edge of a lever $d$ adjacent the enlarged rear end $q$ thereof. The lever $d$ is mounted to swing on a pin or fulcrum $n'$, which fits at its ends in seats formed in a pair of spaced plates P and P', arranged within the case, and is located slightly beyond the arm $m'$, the front end of the lever extending through a longitudinally-slotted, graduated scale $c$ and terminating in a transversely-arranged index finger $a$. The scale $c$ is disposed vertically adjacent the large end of the case C in position to be read through the transparent wall thereof, and is curved to an arc of which the fulcrum or pivot $n'$ constitutes the center, as will be understood. The graduation lines marked on the scale extend transversely thereof, and are calculated for different altitudes to correspond to the different pressure reactions to which the funnels are subjected, the lowermost or zero line being reached by the index finger $a$ at the very moment when the machine touches the ground.

The various parts, as far as described, act in substantially the following manner: The air pressures exerted upon the aneroid cup $b$ cause its diaphragm member to flex and, in consequence, draw the lever L inwardly toward it, assuming, of course, that the machine is descending; (if the machine is ascending, then the diaphragm will flex in an outward direction or expand, and the lever L will be forced away from the cup). In any case, the movement of the lever will be transmitted by its offset end to the arm $m$ of the rock shaft $n$, and from the latter, through arm $m'$, to the indicator lever $d$, with the result that said indicator lever will be swung downward, and its finger $a$ will gradually approach the lowermost graduation on scale $c$, reaching the graduation exactly at the same time that the machine reaches the ground. Hence the position of the index finger upon the scale will constantly indicate the distance of the machine from the ground, and readings can be taken whenever desired. The indicator lever has a slight tendency toward backward or upward movement, due to the provision of its enlarged head $q$, which functions as a weight to correspondingly overbalance the long arm of the lever.

To enable the accurate adjustment of parts and to compensate for any errors which may occur by reason of deviation between the funnels arising in consequence of possible dissymmetry of action or non-similarity of the zone wherein they are placed, a second aneroid cup $b'$ is provided, which communicates with the atmosphere by way of a tube or nipple $e$ and has connected to it a shutter $v$ by means of a suitable coupling $h$, the latter being located centrally of the flexible portion or diaphragm of the cup and centrally of the shutter as well. The ends of the shutter project diametrically beyond the cup and are engaged by springs $r$ and $r'$, the tension of which is regulated by thumb-screws $p$ and $p'$, so that by turning these screws in the proper direction it is possible to adjust the entire mechanism of the receiver, due to the fact that the coupling $h$ is connected to the free end of the lever L.

While the apparatus is primarily designed to indicate the proximity of the ground, it will also serve to indicate the presence of obstacles of large dimensions or area, such, for example, as dense woods, which will produce the same, or substantially the same effects upon the funnels as the grounds.

I claim as my invention:—

1. The combination, with an air craft of an indicating apparatus, comprising a pair of funnels located at vertically-spaced points on the air craft, and a receiving device with which the funnels are connected and including an indicator adapted to automatically measure the difference of the aerodynamic pressures to which the funnels are subjected.

2. The combination, with an air craft, of an indicating apparatus, comprising a pair of funnels located at vertically-spaced points on the air craft, and a receiving device with which the funnels are connected and including a scale, an indicator member co-operative therewith, and a lever system for operating said index member in accordance with the difference of the aerodynamic pressures to which the funnels are subjected.

3. The combination, with an air craft, of an indicating apparatus, comprising a pair of funnels located at vertically-spaced points on the air craft, and a receiving device with which the funnels are connected, said device embodying a diaphragm member subjected to aerodynamic stresses at opposite sides and an indicator operatively connected with said diaphragm member.

4. The combination, with an air craft, of an indicating apparatus, comprising a pair of funnels located at vertically-spaced points on the air craft, and a receiving device with which the funnels are connected, said device embodying a diaphragm member subjected to aerodynamic stresses at opposite sides, an indicator lever, a scale along which said lever is arranged to travel, and a lever system connecting said diaphragm member and said lever for operating the latter from the former.

5. The combination, with an air craft, of an indicating apparatus, comprising a pair of funnels located at vertically-spaced points on the air craft, and a receiving device with which the funnels are connected and including an indicator for automatically measuring the difference of the aerodynamic pressures to which the funnels are subjected and means connected with said indicator to compensate for errors in its measurements.

6. The combination, with an air craft, of an indicating apparatus, comprising a pair of funnels located at vertically-spaced points on the air craft, and a receiving device embodying an air-tight case with the interior of which the funnels are in tubular communication and an indicator within said case adapted to automatically measure the difference of the aerodynamic reactions taking place at said funnels.

7. The combination, with an air craft, of an indicating apparatus, comprising a pair of funnels located at vertically-spaced points on the air craft, and a receiving device embodying an air-tight case, an aneroid cup within the case, one funnel having a tube leading from it into the interior of said cup, and the other funnel having a tube leading from it and opening into the interior of said case, an indicator within said case and operatively associated with said cup for automatically measuring the difference of the aerodynamic pressures to which the funnels are subjected, and means connected with said indicator to compensate for errors in its measurements.

In testimony whereof I have signed this specification in the presence of two subscribing witnesses.

ROGER COURTOIS-SUFFIT.

Witnesses:
   JOHN F. SIMONS,
   GEORGE LOISEL.